US005284324A

United States Patent [19]

Bunger

[11] Patent Number: 5,284,324

[45] Date of Patent: Feb. 8, 1994

[54] DERRICK

[76] Inventor: Richard E. Bunger, 13625 S. 33rd St., Phoenix, Ariz. 85044

[21] Appl. No.: 956,162

[22] Filed: Oct. 5, 1992

[51] Int. Cl.[5] .......................... B66D 1/00; A47J 47/16

[52] U.S. Cl. .................................... 254/266; 248/132; 248/188.7; 254/334

[58] Field of Search ............... 254/266, 334, 352, 372; 248/128, 132, 188.7

[56] References Cited

U.S. PATENT DOCUMENTS

| | | | |
|---|---|---|---|
| 661,592 | 11/1900 | Svenson | 254/334 |
| 4,019,716 | 4/1977 | Smith | 254/334 |
| 4,860,404 | 8/1989 | Flachs | 254/334 X |

*Primary Examiner*—Daniel P. Stodola
*Assistant Examiner*—Michael R. Mansen
*Attorney, Agent, or Firm*—Warren F. B. Lindsley

[57] ABSTRACT

A derrick for raising and lowering a cargo container which comprises a tri-pod structure having a pulley within its apex for engaging and lifting and lowering the load. The tri-pod structure has a roller for engaging the load at the top or apex of the derrick with a hook for engaging the cargo container at its base. The hook includes a pair of shoes one for engaging the outside surface of the cargo container and a second one for engaging the inside surface of the cargo container at the area of hook contact with the cargo container.

6 Claims, 1 Drawing Sheet

DERRICK

BACKGROUND OF THE INVENTION

This invention relates to devices for raising and lowering a load and more particularly to a tri-pod structure one for raising and lowering each corner of a storage container preliminary to driving the bed of a wheel mounted vehicle under it for transportation purposes.

DESCRIPTION OF THE PRIOR ART

Mechanical devices for lifting and shifting heavy weights are known with one of the simplest forms of derricks being the gin, a tri-pod of three legs with a compound pulley at the apex and another at the hoisting hook and a windlass to operate the pulley rope. These simple derricks are easily portable and are used for lifting stones, pulling stumps, lowering iron pipes into trenches and similar work.

SUMMARY OF THE INVENTION

In accordance with the invention claimed, an improved derrick is disclosed which may be adjustably positioned one at each corner of a cargo container for lifting separately each corner of the cargo container while continuously adjusting itself to the changing position of the load.

It is, therefore, one object of this invention to provide a new and improved derrick.

Another object of this invention is to provide an improved derrick which adjusts itself with movement of the load.

A further object of this invention is to provide an improved collapsable derrick for ease in storage and transporting to various sites.

A further object of this invention is to provide an improved derrick which employs a novel hook engaging clamp that interlocks with the base of the load.

A still further object of this invention is to provide a new and improved derrick for lifting and lowering a corner of cargo container which adjusts itself to the movement of the cargo container due to lifting procedures by similar derricks at other corners of the cargo container.

A still further object of this invention is to provide an improved derrick, one for use on each corner of a cargo container, the base of which is off set or slanted outwardly from its apex for providing clearance at its base for a truck or trailer to back under the elevated container.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described with reference to the accompanying drawing in which.

DESCRIPTION OF THE PREFERRED EMBODIMENT

Figure 1:
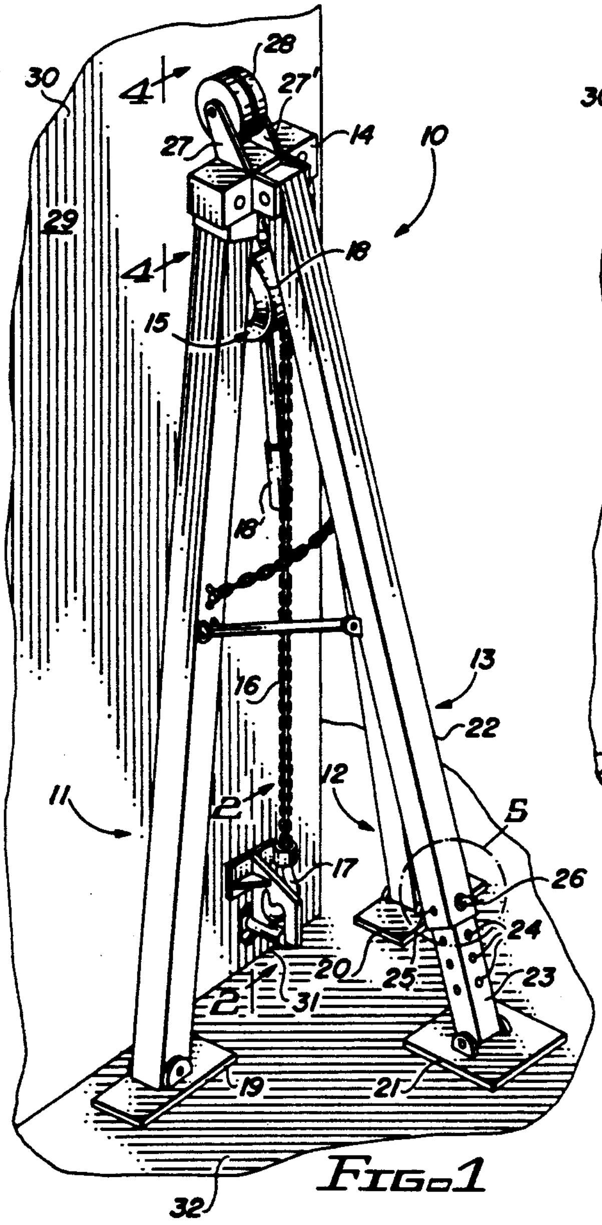
FIG. 1 is a perspective view of a derrick of a tri-pod configuration employing a pulley mounted at its apex and embodying the invention.

Referring more particularly to the drawing by characters of reference, FIG. 1 discloses a derrick 10 comprising a tri-pod having legs 11, 12 and 13 that are fastened together at the top by a collar 14 which forms the apex of the structure. The structure is provided with a pulley 15 at its apex within the confines of the tapering legs which operates a pulley rope or chain 16 having a hoisting hook 17 at its end. Pulley 15 comprises a windlass 18 for hoisting chain 16 by means of the pivotal action of a handle 18' retractedly connected to the windlass 18.

As shown in FIG. 1 each of legs 11, 12 and 13 of the derrick is provided with pivotally connected shoes 19, 20 and 21 with leg 13 comprising a telescopically combination of parts 22 and 23. Part 23 is provided with apertures 24 along its length for selective alignment with apertures 25 at the bottom of part 22 for receipt of a pin 26 for selective adjustment of the length of leg 13 in a known manner.

As noted from FIG. 1 the apex of the derrick and/or collar 14 thereof supports a pair of flanges 27 and 27' which rotatably mounts therebetween a roller means 28. This roller means causes the wall 29 of the cargo container 30 to easily and at reduced friction slide past the apex of the derrick as the hoist lifts the base 31 of the cargo container off the ground 32 with the base of legs 11 and 12 being off set from the base of the container.

Figure 2:
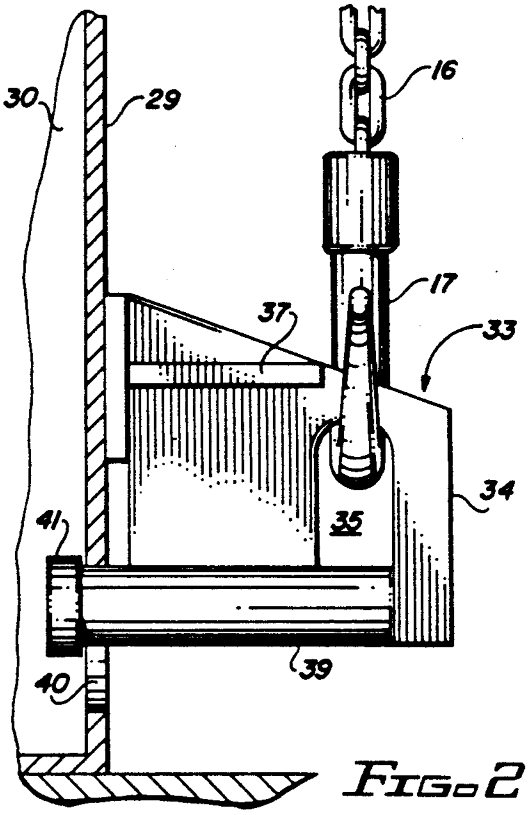
FIG. 2 is a cross sectional view of FIG. 1 taken along the line 2—2.
Figure 3:
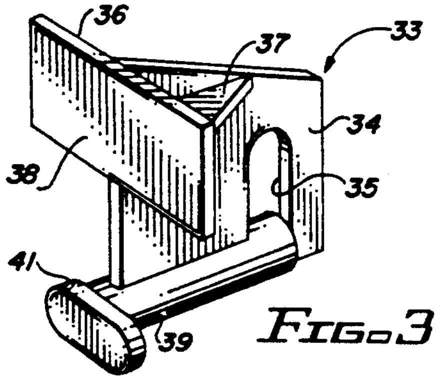
FIG. 3 is a perspective view of the load engaging clamp as shown in FIGS. 1 and 2.
Figure 4:
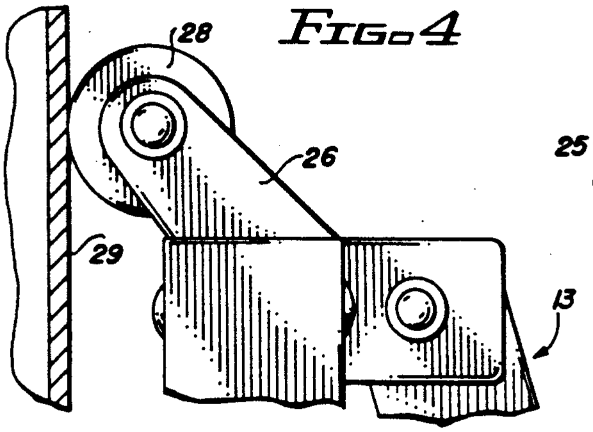
FIG. 4 is a cross sectional view of FIG. 1 taken along the line 4—4.
Figure 5:
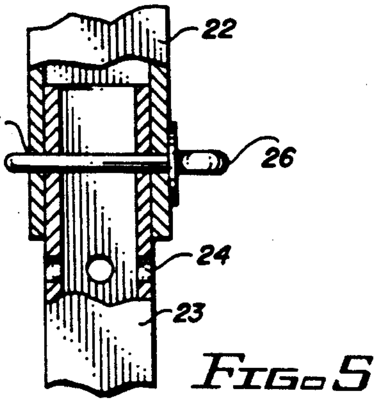
FIG. 5 is an enlarged sectional view of the circled area identified by the reference character 5.

In order to readily connect and interlock the derrick to the cargo container, a dual purpose clamp 33 is provided as more clearly shown in FIGS. 2 and 3. This clamp comprises a frame 34 extending substantially vertical to the associated cargo container which frame is provided with a slot 35 through which hook 17 extends as shown in FIG. 2. The frame is further provided with a shoe 36 at one of its ends supported by flanges 37 on each side of the frame, the flat outer force transmitting surface 38 of which is extended to lie flat against surface 29 of the cargo container 30.

Clamp 33 is further provided with a solid tubular member 39 extending axially along the base edge of frame 34 and arranged to extend outward of shoe 36 so as to extend within a slot 40 in the base 31 of the cargo container. At the end of member 39 a shoe 41 is provided which shoe extends laterally of the axis of member 39 and having a width substantially smaller than the length of slot 40 in cargo container 30 and a length greater than the width of slot 40.

Thus, when the length of shoe 41 extends vertically of the cargo container it may be inserted into and through slot 40 and then when the clamp is rotated ninety degrees the shoe extends across the width of slot 40, thereby locking the clamp to the cargo container in the manner shown in FIG. 2 and at the same time engaging by shoe 36 the outside surface of the cargo container.

Although but a single embodiment of the present invention has been illustrated and described, it will be apparent to those skilled in the art that various changes and modifications may be made therein without departing from the spirit of the invention or from the scope of the appended claims.

What is claimed is:

1. A derrick adapted to lift a corner of a cargo container comprising:

a tripod comprising first, second and third elongated legs each having a pivotally mounted shoe at their ground engaging ends and tapering to an apex at their other ends, collar means mounted at said other ends to pivotally hold said legs in a tripod arrangement, a windlass mounted within the confines of said legs at the apex end thereof, and including a chain with a hook means at one end thereof, said windlass including a rachet actuated by a handle for winding said chain therearound for lifting the cargo container when said hook means engages a wall thereof, and roller means mounted at said other ends of said legs for extending outwardly of the confine of said tripod arrangement for rollingly engaging a surface of the cargo container being lifted.

2. The derrick set forth in claim 1 wherein:

said hook means includes a clamp for engaging the wall of the cargo container and simutaneously extending through a slot in the wall of the container and interlocking therewith.

3. The derrick set forth in claim 2 wherein:

said clamp interlocks with the wall of the cargo container upon a predetermined rotation of said clamp after extending through said slot.

4. The derrick set forth in claim 3 wherein:

said hook means comprises a hook, and said clamp includes a slot with which said hook engages, a first shoe for engaging the outside surface of the cargo container and a second shoe for extending through a slot in the cargo container and engaging an inside surface of the wall of the cargo container.

5. The derrick set forth in claim 3 wherein:

said clamp having a first means for engaging the outside surface of the cargo container and a second means for extending through a slot in the cargo container for engaging an inside surface of the wall of the cargo container.

6. The derrick set forth in claim 5 wherein:

one of said legs is adjustable in length.

* * * * *